(12) United States Patent
Shiomi et al.

(10) Patent No.: US 8,177,003 B2
(45) Date of Patent: May 15, 2012

(54) FUEL CELL ELECTRIC VEHICLE

(75) Inventors: Takeshi Shiomi, Yokohama (JP);
Hisashi Nakata, Yokosuka (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 13/116,754

(22) Filed: May 26, 2011

(65) Prior Publication Data

US 2011/0226540 A1   Sep. 22, 2011

Related U.S. Application Data

(62) Division of application No. 12/065,566, filed as application No. PCT/IB2006/002986 on Oct. 24, 2006, now Pat. No. 7,971,670.

(30) Foreign Application Priority Data

Oct. 25, 2005  (JP) ................................. 2005-309865

(51) Int. Cl.
*B60K 3/00* (2006.01)
(52) U.S. Cl. .................... 180/65.1; 180/65.31; 429/434; 429/454; 429/456
(58) Field of Classification Search .................... 429/34, 429/454, 456; 180/65.31, 65.1
See application file for complete search history.

(56) References Cited

U.S. PATENT DOCUMENTS

| | | | |
|---|---|---|---|
| 4,758,481 A * | 7/1988 | Fauvel ........................... | 429/458 |
| 6,053,266 A * | 4/2000 | Greenhill et al. .......... | 180/65.31 |
| 6,223,844 B1 * | 5/2001 | Greenhill et al. ............. | 429/429 |
| 6,293,264 B1 * | 9/2001 | Middlebrook ................. | 123/563 |
| 6,492,055 B1 * | 12/2002 | Shimotori et al. ............ | 429/435 |
| 6,613,470 B1 * | 9/2003 | Sugita et al. ................... | 429/416 |
| 6,632,556 B2 * | 10/2003 | Guthrie et al. ................ | 429/461 |
| 6,887,606 B2 * | 5/2005 | Parr et al. ...................... | 429/429 |
| 6,973,982 B2 * | 12/2005 | Yoshikawa et al. ........... | 429/430 |
| 7,174,977 B2 * | 2/2007 | Enjoji et al. .................. | 180/65.1 |
| 7,238,441 B2 * | 7/2007 | Andreas-Schott et al. ... | 429/454 |

(Continued)

FOREIGN PATENT DOCUMENTS

JP  2002-050391 A  2/2002

(Continued)

OTHER PUBLICATIONS

The International Search Report for the international application No. PCT/IB2006/002986, dated Apr. 17, 2007, mailed May 1, 2007.

(Continued)

*Primary Examiner* — J. Allen Shriver, II
*Assistant Examiner* — Erez Gurari
(74) *Attorney, Agent, or Firm* — Global IP Counselors, LLP

(57) ABSTRACT

A fuel cell electric vehicle includes a driving motor for driving a pair of wheels, a fuel cell for generating electricity used in the driving motor with the fuel cell being disposed above the driving motor, and supply/discharge manifolds. The supply/discharge manifolds are for transporting the fuel gas, the oxidizing gas and the coolant to or from the fuel cell from lateral end portions of a lower part of the fuel cell so that the fuel gas, the oxidizing gas and the coolant supplied to and discharged from the fuel cell flow in a substantially vertical direction with respect to a vehicle without the fuel gas, the oxidizing gas and the coolant passing through a center portion between the lower part of the fuel cell and an upper part of the driving motor.

10 Claims, 9 Drawing Sheets

U.S. PATENT DOCUMENTS

| | | | |
|---|---|---|---|
| 7,338,731 B2 * | 3/2008 | Ingriselli et al. | 429/460 |
| 7,374,001 B2 * | 5/2008 | Uozumi et al. | 180/65.31 |
| 7,595,125 B2 * | 9/2009 | Enjoji et al. | 429/465 |
| 7,648,793 B2 * | 1/2010 | Sato et al. | 429/415 |
| 2002/0187380 A1 * | 12/2002 | Tanaka et al. | 429/34 |
| 2002/0187382 A1 * | 12/2002 | Nishiumi et al. | 429/34 |
| 2002/0189873 A1 * | 12/2002 | Mizuno | 180/65.3 |
| 2003/0044657 A1 * | 3/2003 | Hayashi et al. | 429/19 |
| 2003/0108784 A1 * | 6/2003 | Enjoji et al. | 429/34 |
| 2003/0148168 A1 * | 8/2003 | Enjoji et al. | 429/38 |
| 2004/0028983 A1 * | 2/2004 | Hayashi et al. | 429/36 |
| 2004/0149500 A1 * | 8/2004 | Chernoff et al. | 180/65.1 |
| 2004/0253499 A1 * | 12/2004 | Sato et al. | 429/32 |
| 2005/0106446 A1 | 5/2005 | Sato et al. | |
| 2007/0122669 A1 * | 5/2007 | Kusano et al. | 429/26 |
| 2008/0230288 A1 * | 9/2008 | Shiomi et al. | 180/65.3 |
| 2009/0004533 A1 * | 1/2009 | Tanaka et al. | 429/34 |

FOREIGN PATENT DOCUMENTS

| | | |
|---|---|---|
| JP | 2003-173790 A | 6/2003 |
| JP | 2004-039541 A | 2/2004 |
| JP | 2004-063099 A | 2/2004 |
| JP | 2004-243892 A | 9/2004 |
| JP | 2005-158603 A | 6/2005 |
| JP | 2005-251526 A | 9/2005 |
| JP | 2005-251604 A | 9/2005 |

OTHER PUBLICATIONS

The extended European Search Report of corresponding European Patent Application No. 06820799-1227, dated Nov. 5, 2009.

An English translation of the Japanese Office Action of corresponding Japanese Application No. JP 2006-101608, dated Apr. 21, 2011, mailed Apr. 26, 2011.

* cited by examiner

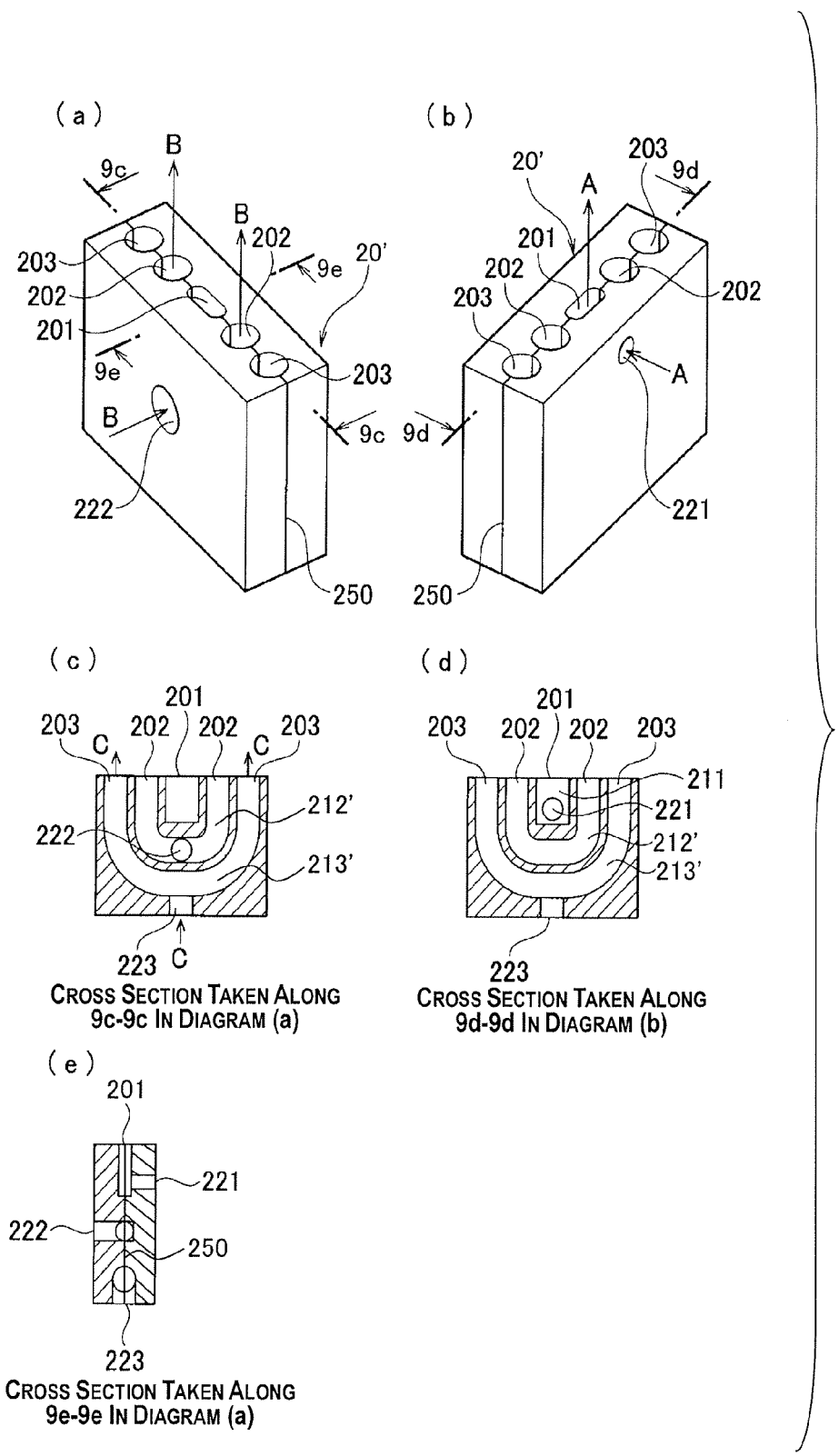

FUEL CELL ELECTRIC VEHICLE

CROSS-REFERENCE TO RELATED APPLICATIONS

This application is a divisional application of U.S. patent application Ser. No. 12/065,566, now pending. The entire disclosure of U.S. patent application Ser. No. 12/065,566 is hereby incorporated herein by reference. This application claims priority to Japanese Patent Application No. 2005-309865 filed on Oct. 25, 2005. The entire disclosure of Japanese Patent Application No. 2005-309865 is hereby incorporated herein by reference.

BACKGROUND OF THE INVENTION

1. Field of the Invention

The present invention relates to a mounting structure for mounting a fuel cell on an electric vehicle. More specifically, the present invention relates to a fuel cell electric vehicle in which a fuel cell is mounted together with a driving motor.

2. Background Information

Japanese Laid-Open Patent Application No. 2003-173790 discloses a conventional fuel cell electric vehicle in which a fuel cell stack is mounted in a front compartment. The fuel cell stack is formed by stacking a plurality of unit fuel cells in the vertical direction with respect to the vehicle.

In view of the above, it will be apparent to those skilled in the art from this disclosure that there exists a need for an improved fuel cell electric vehicle. This invention addresses this need in the art as well as other needs, which will become apparent to those skilled in the art from this disclosure.

SUMMARY OF THE INVENTION

In the conventional fuel cell electric vehicle described in the above mentioned reference, a large space is required for installing a plurality of fluid supply/discharge pipes for supplying and discharging fuel cell fluids (such as fuel gas, oxidizing gas, etc.) used in the fuel cell stack in order to connect the fluid supply/discharge pipes to an upper side and a lower side of the fuel cell stack. Therefore, due to this space requirement for the fluid supply/discharge pipes, the number of the unit fuel cells stacked together to form the fuel cell stack cannot be greatly increased.

The present invention is contrived in light of the above-mentioned problem. Thus, it is an object of the present invention to provide a fuel cell electric vehicle that can increase output power of the fuel cell by increasing the number of unit fuel cells stacked together to form a fuel cell stack.

In order to achieve the above mentioned object, a fuel cell electric vehicle is provided that basically includes power outputting means, electricity generating means and fluid supplying/discharging means. The power outputting means has a function for driving a pair of wheels. The electricity generating means has a function for generating electricity used in the power outputting means with the electricity generating means being disposed above the power outputting means. The fluid supplying/discharging means has a function for transporting the fuel gas, the oxidizing gas and the coolant to or from the electricity generating means from lateral end portions of a lower part of the electricity generating means so that the fuel gas, the oxidizing gas and the coolant supplied from the fluid supplying/discharging means to the electricity generating means and discharged from the electricity generating means to the fluid supplying/discharging means flow in a substantially vertical direction with respect to a vehicle without the fuel gas, the oxidizing gas and the coolant passing through a center portion between the lower part of the electricity generating means and an upper part of the power outputting means with respect to a lateral direction of the vehicle.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure:

FIG. 9 is a series of diagrams (a) to (e) illustrating a structure of a supply/discharge manifold in accordance with a third embodiment of the present invention, wherein the diagram (a) is a perspective view of the supply/discharge manifold as viewed from a first side thereof, the diagram (b) is a perspective view of the supply/discharge manifold as viewed from a second side thereof, the diagram (c) is a cross sectional view of the supply/discharge manifold as taken along a section line 9c-9c in the diagram (a), the diagram (d) is a cross sectional view of the supply/discharge manifold as taken along a section line 9d-9d in the diagram (b), and the diagram (e) is a cross sectional view of the supply/discharge manifold as taken along a section line 9e-9e in the diagram (a).

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
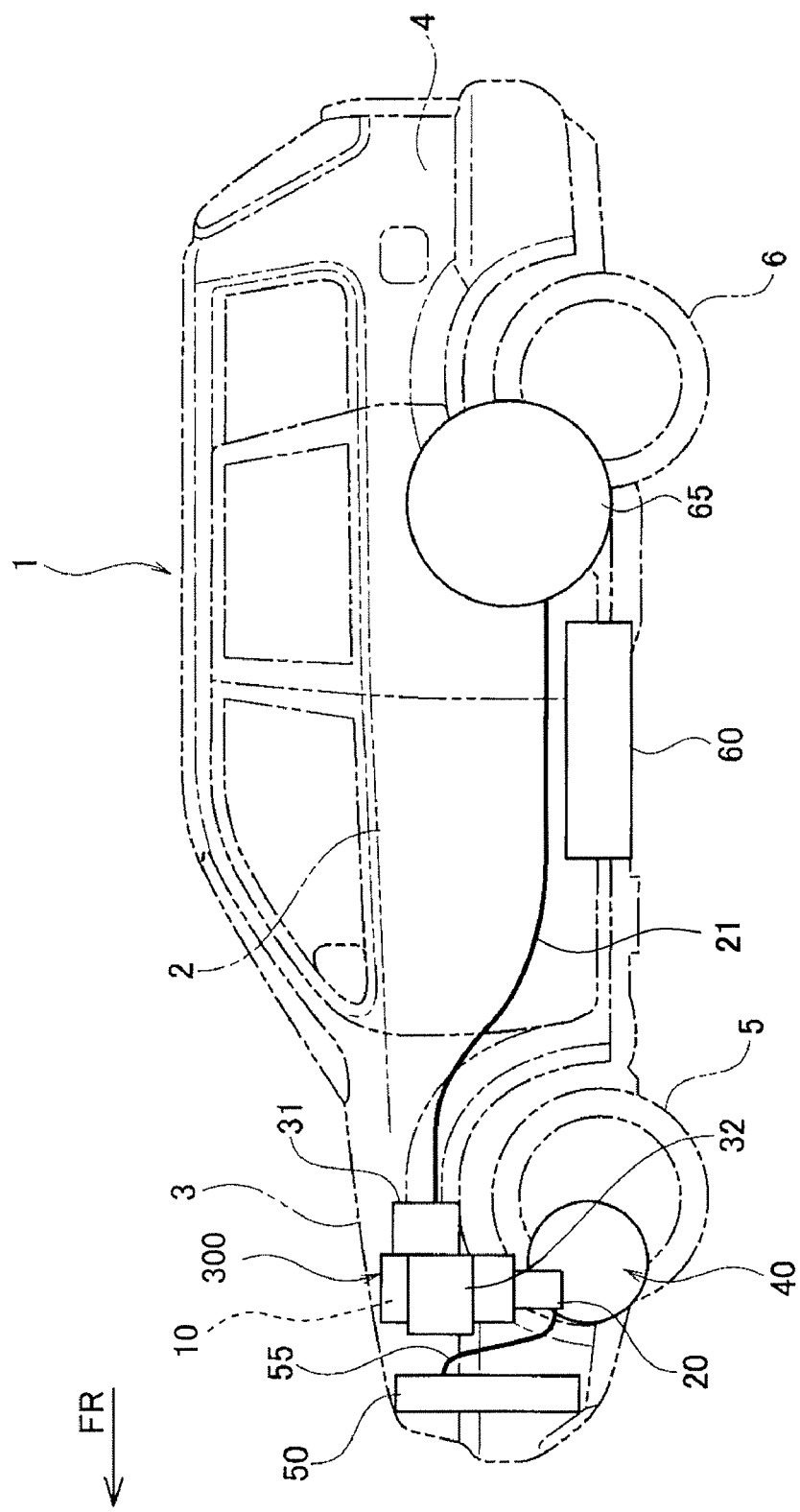
FIG. 1 is a left side schematic elevational view showing an arrangement of a power system of a fuel cell electric vehicle in accordance with a first embodiment of the present invention.

Referring initially to FIGS. 1 to 7, a fuel cell electric vehicle 1 is illustrated in accordance with a first embodiment of the present invention. FIG. 1 is a left side schematic elevational view showing an arrangement of a power system of the vehicle 1 in accordance with the first embodiment. As shown in FIG. 1, the vehicle 1 includes, among other things, a passenger compartment 2, a motor room or motor compartment 3, a trunk compartment 4, a pair of front wheels 5 (left and right front wheels) and a pair of rear wheels 6 (left and right rear wheels). The passenger compartment 2 is disposed in a generally center part of the vehicle 1 with respect to the longitudinal direction of the vehicle 1. The motor compartment 3 (also called an engine compartment, a front mechanical compartment, or a front box) is disposed in the front part of the vehicle 1. The trunk compartment 4 is disposed in the rear part of the vehicle 1. As shown in FIG. 1, the front wheels 5 are disposed under the motor compartment 3, and the rear wheels 6 are disposed in the rear part of the passenger compartment 2. The arrow FR in FIG. 1 indicates the front direction, which is the direction of travel of the vehicle 1.

As shown in FIG. 1, a fuel cell 10 is mounted inside the motor compartment 3 above a driving motor 40, which is disposed between the left and right front wheels 5. The fuel cell 10 is configured and arranged to generate electric power to drive the driving motor 40, thereby causing the front wheels 5 to rotate to move the vehicle 1. The fuel cell 10 is housed inside a housing 300 (casing).

Figure 2:
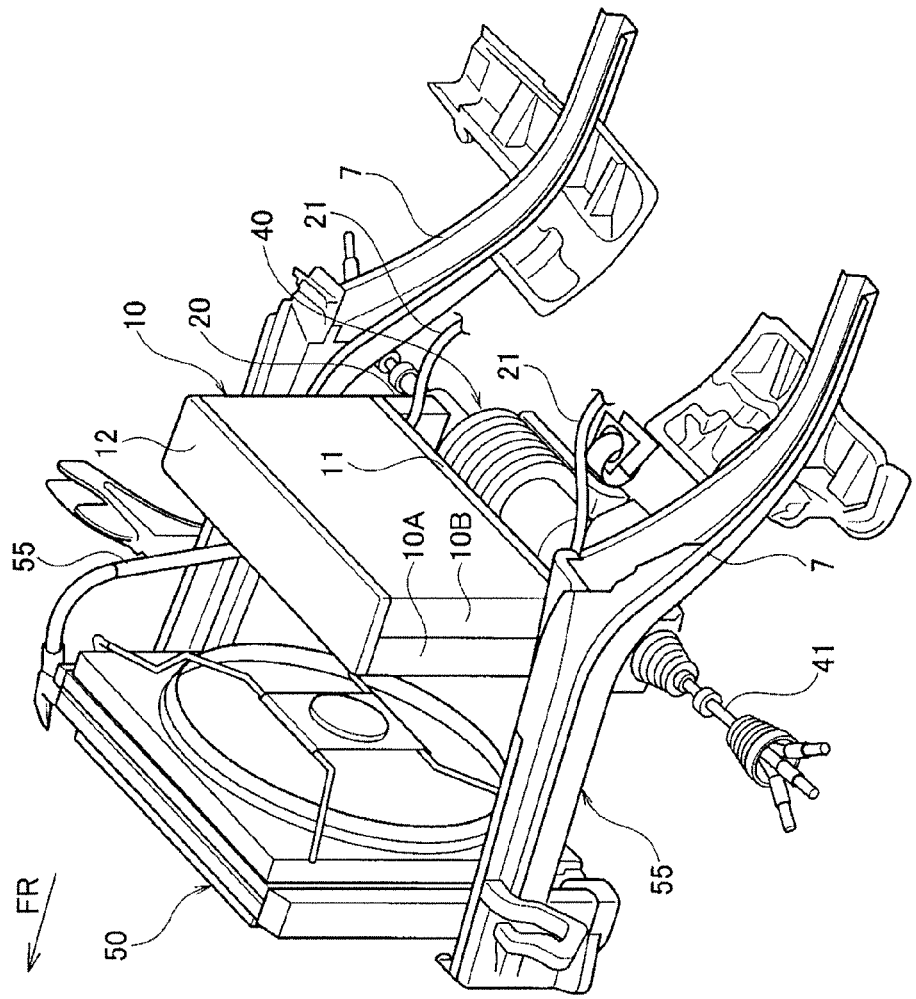
FIG. 2 is a rear side perspective view of an area of the fuel cell electric vehicle where a fuel cell is disposed illustrating a state in which a fuel cell housing is removed in accordance with the first embodiment of the present invention.
Figure 3:
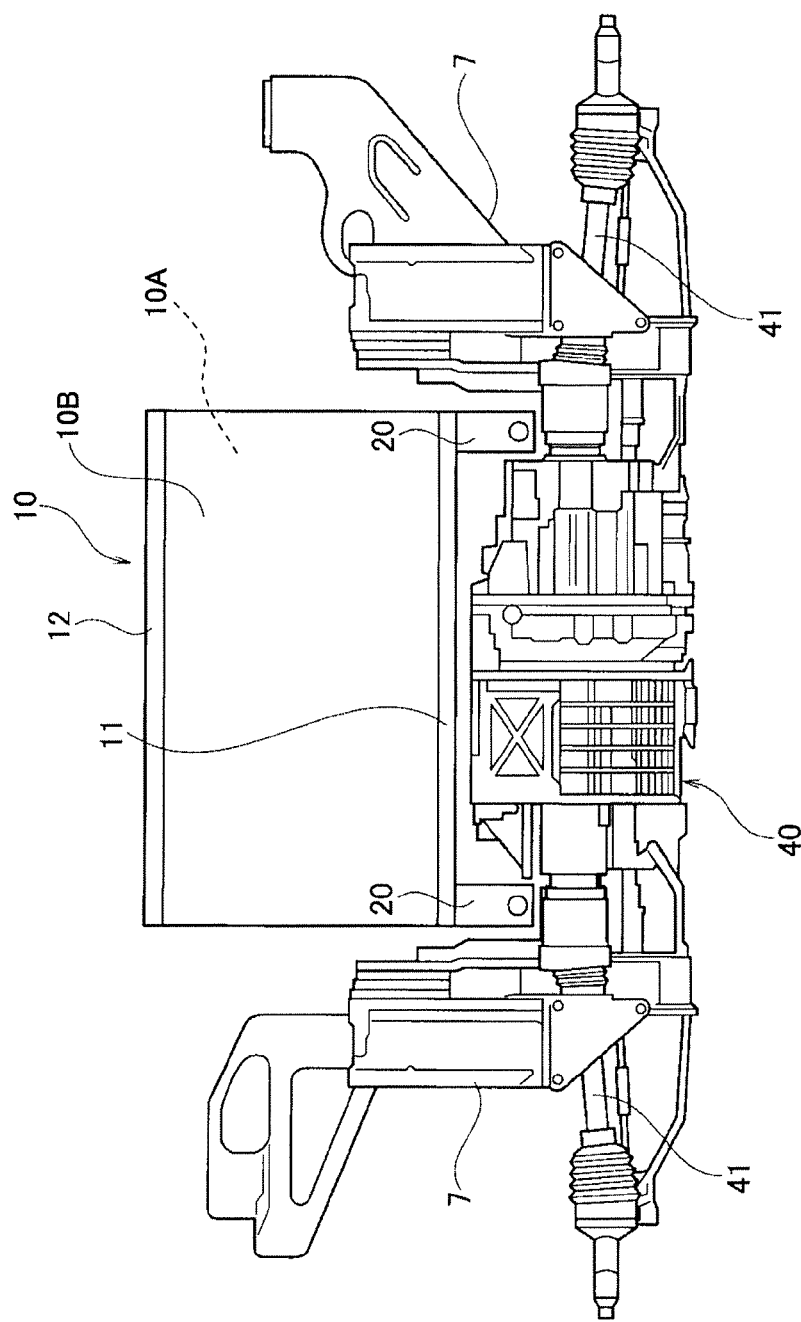
FIG. 3 is a rear elevational view of the area of the fuel cell electric vehicle where the fuel cell is disposed illustrating a state in which the fuel cell housing is removed in accordance with the first embodiment of the present invention.
Figure 4:
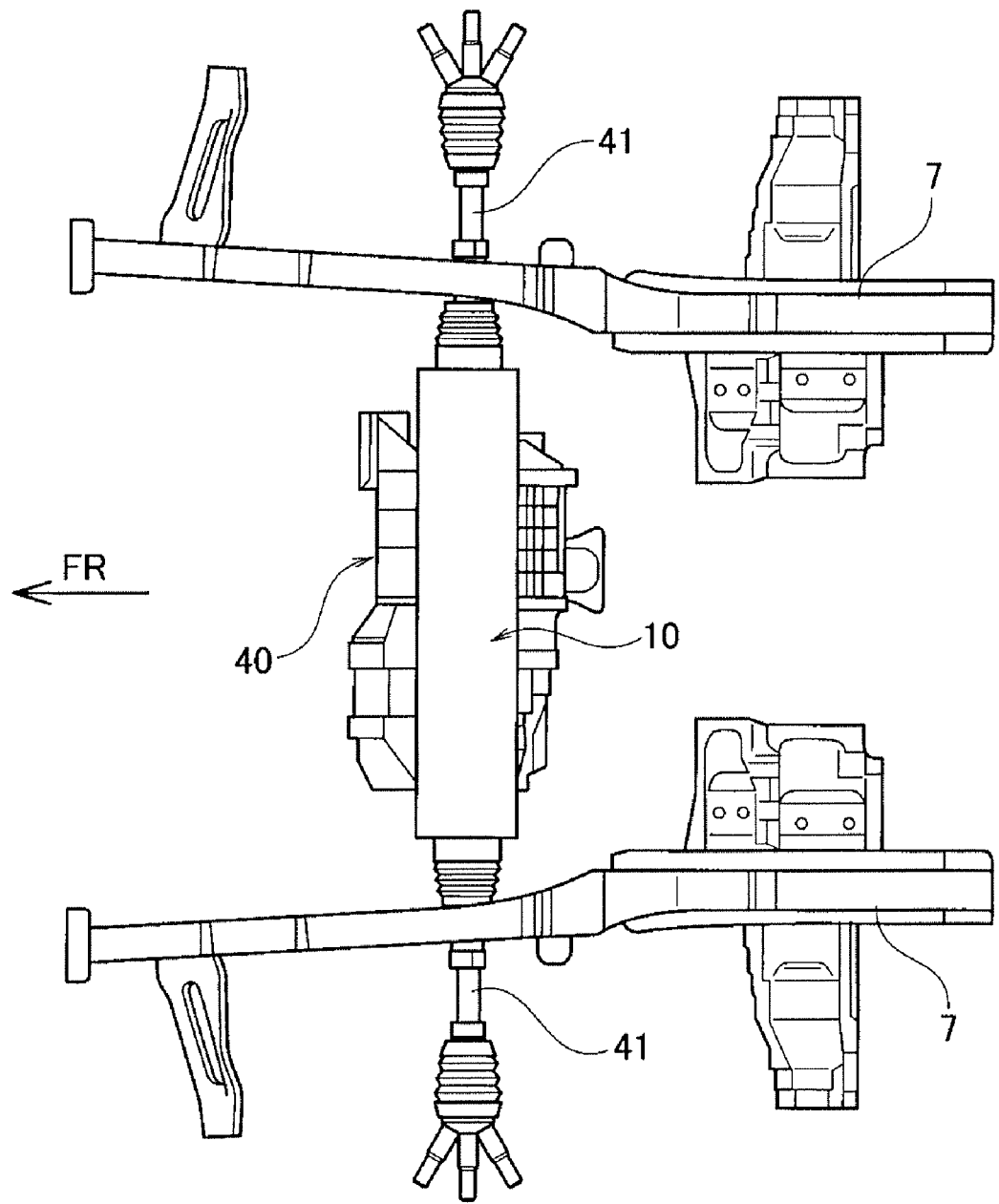
FIG. 4 is a top plan view of the area of the fuel cell electric vehicle where the fuel cell is disposed illustrating a state in which the fuel cell housing is removed in accordance with the first embodiment of the present invention.

FIG. 2 is a rear side perspective view of an area inside the motor compartment 3 where the fuel cell 10 is disposed. FIG. 3 is a rear elevational view of the area inside the motor compartment 3 where the fuel cell 10 is disposed. FIG. 4 is a top plan view of the area inside the motor compartment 3 where the fuel cell 10 is disposed illustrating a state in which the fuel cell housing 300 is removed. FIGS. 2 to 4 illustrates a state in which the fuel cell housing 300 is removed.

Figure 5:
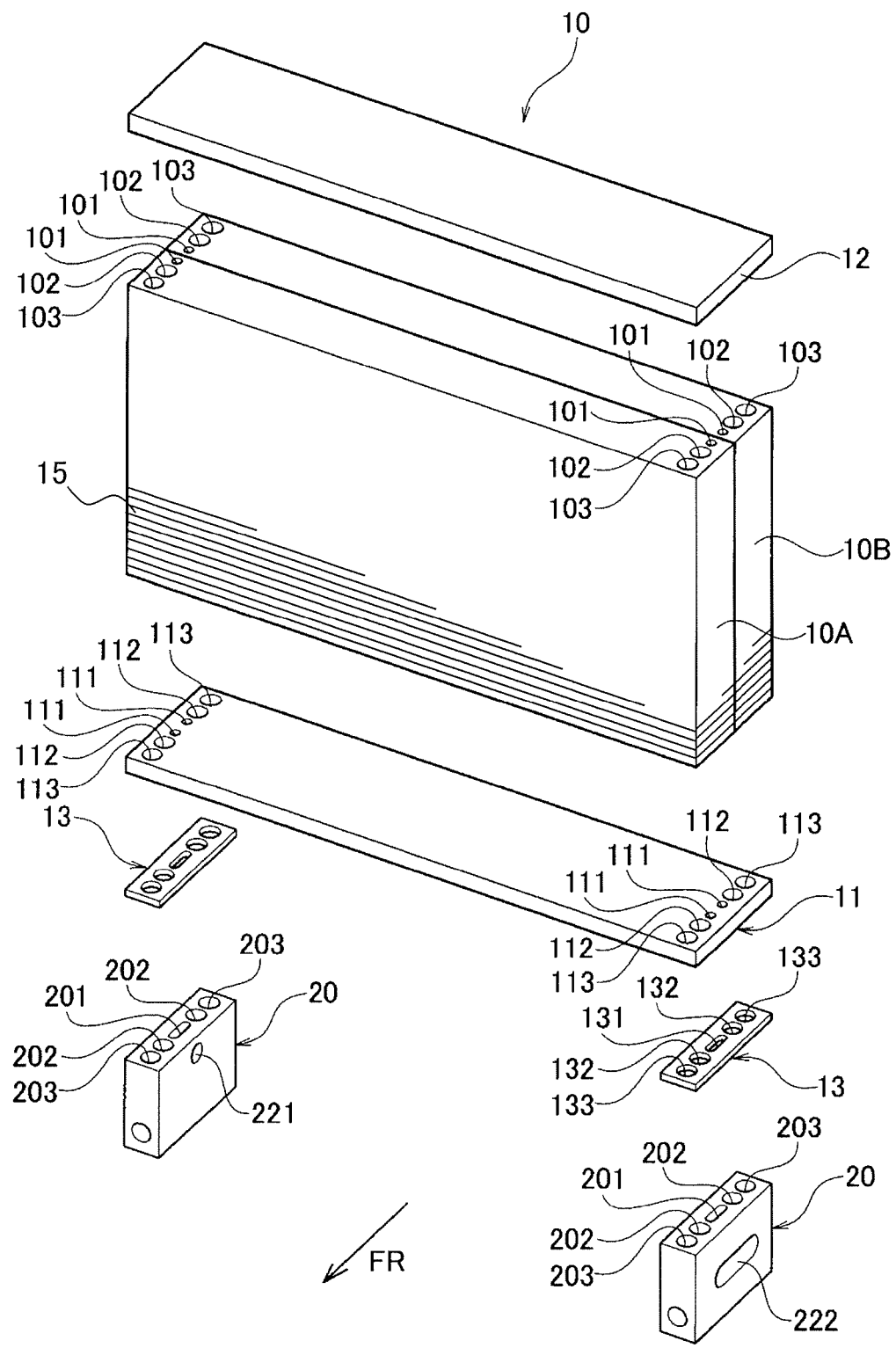
FIG. 5 is an exploded front perspective view illustrating an attachment structure between the fuel cell and a pair of supply/discharge manifolds in accordance with the first embodiment of the present invention.

The fuel cell 10 is preferably a solid polymer electrolyte (polyelectrolyte) type fuel cell. As shown in FIG. 2, the fuel cell 10 includes a pair of fuel cell stacks 10A and 10B, a lower end plate 11 and an upper end plate 12. The fuel cell stacks 10A and 10B the lower and upper end plates 11 and 12 are coupled together to form an integral fuel cell unit. As shown in FIG. 5, each of the fuel cell stacks 10A and 10B is formed by stacking a plurality of unit cells 15 (unit fuel cells). Each of the unit cells 15 includes a membrane-electrode assembly constructed from an electrolyte membrane including an ion exchange membrane, a fuel electrode disposed on one surface of the electrolyte membrane, and an air electrode disposed on the other surface of the electrolyte membrane. A separator, which forms channels used to supply fuel gas and oxidizing gas to the fuel electrode and the air electrode, respectively, is installed in the membrane-electrode assembly to form the unit cell 15.

In the vehicle 1, as shown in FIG. 2, the two fuel cell stacks 10A and 10B are aligned and combined in the longitudinal direction of the vehicle 1 to form the fuel cell 10 that has an integrated structure. As mentioned above, the fuel cell 10 is positioned inside the motor compartment 3 and mounted above the driving motor 40. In each of the fuel cell stacks 10A and 10B, the unit cells 15 are stacked in the vertical direction of the vehicle 1. In a top plan view, the unit cells 15 in each of the fuel cell stacks 10A and 10B have an elongated rectangular shape that is longer in the lateral direction of the vehicle 1 and shorter in the longitudinal direction of the vehicle 1. Furthermore, the unit cells 15 having the rectangular shape are arranged so that the fuel cell fluids (fuel gas, oxidizing gas, and coolant) flow in the unit cells 15 from one side of the vehicle 1 to the other side with respect to the lateral direction of the vehicle 1. As used herein, the "fuel cell fluids" includes the fuel gas, the oxidizing gas and the coolant that are supplied to the fuel cell 10.

Furthermore, as seen in FIG. 3, the fuel cell 10 has a pair of supply/discharge manifolds 20 (first and second supply/discharge manifolds). The supply/discharge manifolds 20 are installed as a supply/discharge manifold section on the left and right ends of the lower portions of the fuel cell stacks 10A and 10B (both lateral lower end portions of the fuel cell stacks 10A and 10B with respect to the lateral direction of the vehicle 1) for distributing and collecting (converging) the fuel cell fluids (the fuel gas, the oxidizing gas, and the coolant) with respect to the fuel cell stacks 10A and 10B. More specifically, the distribution of the fuel cell fluids into the fuel cell stacks 10A and 10B is carried out by one of the supply/discharge manifolds 20 disposed on one side of the fuel cell 10, and the collecting of the fuel cell fluids from the fuel cell stacks 10A and 10B is carried out by the other one of the supply/discharge manifolds 20 disposed on the other side of the fuel cell 10.

FIG. 5 is an exploded front perspective view of the fuel cell 10 including the fuel cell stacks 10A and 10B and the supply/discharge manifolds 20. As shown in FIG. 5, each of the fuel cell stacks 10A and 10B includes a pair of through-manifolds 101, a pair of through-manifolds 102 and a pair of through-manifolds 103 formed in both lateral sides thereof, respectively. The through-manifolds 101, 102 and 103 are configured and arranged to supply or discharge the fuel gas, the oxidizing gas, and the coolant to and from the unit cells 15 of each of the fuel cell stacks 10A and 10B. Generally, the through-manifolds 101, 102 and 103 are formed by forming holes in each of the unit cells 15 at positions corresponding to the through-manifolds 101, 102 and 103 for distributing the fuel gas, the oxidizing gas, and the coolant to the interior part of each of the unit cells 15, and then stacking the unit cells 15 so that these holes are aligned to fluidly communicate with each other.

As seen in FIG. 5, as mentioned above, each of the fuel cell stacks 10A and 10B includes the through-manifolds 101, 102 and 103 that are formed on both lateral ends of the corresponding one of the fuel cell stacks 10A and 10B. More specifically, the through-manifolds 103 is used for the coolant water, the through-manifolds 102 is used for the oxidizing gas, and the through-manifolds 101 is used for the fuel gas. The through-manifolds 103, 102 and 101 are formed in that order from the front in the fuel cell stack 10A disposed on the front side in the direction of travel of the vehicle 1. Furthermore, the through-manifolds 103, 102 and 101 are formed in that order from the rear in the fuel cell stack 10B disposed on the rear side in the direction of travel of the vehicle 1. In other words, in the fuel cell stack 10A on the front side and the fuel cell stack 10B on the rear side, the order of arrangement of the through-manifolds 101, 102 and 103 are reversed, so that the through-manifolds 103 used for the coolant is positioned on the outermost end (front or rear end) of the fuel cell 10, the through-manifolds 101 for the fuel gas is positioned on the innermost end, and the through-manifolds 102 for the oxidizing gas is positioned in an intermediate position between the through-manifolds 103 and the through-manifolds 101.

As mentioned above, each of the fuel cell stacks 10A and 10B has two of the through-manifolds 101 used for the fuel gas, two of the through-manifolds 102 used for the oxidizing gas, and two of the through-manifolds 103 used for the coolant that are disposed on the left and right side of the respective fuel cell stack 10A or 10B, respectively. One of the through-manifolds 101, 102 and 103 is disposed on one side of the fuel cell stacks 10A and 10B to function as supply manifolds and the other one of the through-manifolds 101, 102 and 103 is disposed on the other side of the fuel cell stack 10A and 10B to function as discharge manifolds.

More specifically, the fuel gas is introduced to one of the supply/discharge manifolds 20 attached to a first lateral end portion of the fuel cell 10 via a fuel gas pipe 21 (FIG. 2) coupled to the supply/discharge manifold 20 attached to the first lateral end portion of the fuel cell 10. Then, the fuel gas is supplied and distributed inside the fuel cell stacks 10A and 10B (i.e., to each of the unit cells 15 constituting the fuel cell stacks 10A and 10B) via the through-manifolds 101 formed in a first lateral side of the fuel cell stacks 10A and 10B. The fuel gas supplied to the fuel cell 10 contributes to the power generating reaction in each of the unit cells 15 of the fuel cell stacks 10A and 10B. Then, after the fuel gas is used in the power generating reaction, the fuel gas flows into the other one of the supply/discharge manifolds 20 attached to a second lateral end portion of the fuel cell 10 via the through-manifolds 101 formed in a second lateral side of the fuel cell stacks 10A and 10B. Therefore, the fuel gas used in the fuel cell stacks 10A and 10B are collected together by the supply/discharge manifold 20 attached to the second lateral end portion of the fuel cell 10, and discharged to the outside via a fuel gas pipe 21 coupled to the supply/discharge manifold 20 attached to the second lateral end portion of the fuel cell 10.

Likewise, the oxidizing gas is introduced to one of the supply/discharge manifolds 20 attached to a first lateral end portion of the fuel cell 10 via an oxidizing gas pipe (not shown) coupled to the supply/discharge manifold 20 attached to the first lateral end portion of the fuel cell 10. Then, the oxidizing gas is supplied and distributed inside the fuel cell stacks 10A and 10B (i.e., to each of the unit cells 15 constituting the fuel cell stacks 10A and 10B) via the through-manifolds 102 formed in a first lateral side of the fuel cell stacks 10A and 10B. The oxidizing gas supplied to the fuel cell 10 contributes to the power generating reaction in each of the unit cells 15 of the fuel cell stacks 10A and 10B. Then, after the oxidizing gas is used in the power generating reaction, the oxidizing gas flows into the other one of the supply/discharge manifolds 20 attached to a second lateral end portion of the fuel cell 10 via the through-manifolds 102 formed in a second lateral side of the fuel cell stacks 10A and 10B. Therefore, the oxidizing gas used in the fuel cell stacks 10A and 10B are collected together by the supply/discharge manifold 20 attached to the second lateral end portion of the fuel cell 10, and discharged to the outside via a oxidizing gas pipe (not shown) coupled to the supply/discharge manifold 20 attached to the second lateral end portion of the fuel cell 10.

Likewise, the coolant is introduced to one of the supply/discharge manifolds 20 attached to a first lateral end portion of the fuel cell 10 via a coolant pipe coupled to the supply/discharge manifold 20 attached to the first lateral end portion of the fuel cell 10. Then, the coolant is supplied and distributed inside the fuel cell stacks 10A and 10B (i.e., to each of the unit cells 15 constituting the fuel cell stacks 10A and 10B) via the through-manifolds 103 formed in a first lateral side of the fuel cell stacks 10A and 10B. The coolant supplied to the fuel cell 10 contributes to adjust temperature of the fuel cell 10. Then, after adjusting the temperature of the fuel cell 10, the coolant flows into the other one of the supply/discharge manifolds 20 attached to a second lateral end portion of the fuel cell 10 via the through-manifolds 103 formed in a second lateral side of the fuel cell stacks 10A and 10B. Therefore, the coolant used in the fuel cell stacks 10A and 10B are collected together by the supply/discharge manifold 20 attached to the second lateral end portion of the fuel cell 10, and discharged to the outside via a coolant pipe coupled to the supply/discharge manifold 20 attached to the second lateral end portion of the fuel cell 10.

With respect to the fuel cell stacks 10A and 10B that are aligned in the longitudinal direction, each of the through-manifolds 101, 102 and 103 of the fuel cell stack 10A and each of the through-manifolds 101, 102 and 103 of the fuel cell stack 10B, which are disposed on the same lateral side of the fuel cell 10 and which are used for the same fuel cell fluid (the fuel gas, the oxidizing gas or the coolant) perform the same function of supplying or discharging the fuel cell fluid. In other words, for example, in a case where the through-manifold 101 on the left side of the fuel cell stack 10A is used for supplying the fuel gas to the fuel cell stack 10A and the through-manifold 101 on the right side is used for discharging the fuel gas from the fuel cell stack 10A, the through-manifold 101 formed on the left side of the fuel cell stack 10B is similarly used for supplying the fuel gas to the fuel cell stack 10B and the through-manifold 101 on the right side of the fuel cell stack 10B is used for discharging the fuel gas from the fuel cell stack 10B. The same is also true for the other through-manifolds 102 and 103 formed in the fuel cell stacks 10A and 10B.

However, the flow direction of each of the fuel cell fluids can be changed among the different fuel cell fluids (the fuel gas, the oxidizing gas or the coolant). In other words, the arrangements of the supply and discharge functions of the through-manifolds 101, 102 and 103 (i.e., the flow direction of the fuel cell fluids in the fuel cell stacks 10A and 10B) can be determined independently of each other (the fuel gas, the oxidizing gas or the coolant). For example, the through-manifolds 102 that are disposed on the left side of the fuel cell stacks 10A and 10B can be used for discharging the oxidizing gas from the fuel cell stacks 10A and 10B, while the through-manifolds 101 that are disposed on the same left side of the fuel cell stacks 10A and 10B are used for supplying the fuel gas to the fuel cell stacks 10A and 10B. In such case, the flow direction of the fuel gas inside the fuel cell stacks 10A and 10B is opposite from the flow direction of the oxidizing gas inside the fuel cell stacks 10A and 10B. It is preferable to arrange the through-manifolds 101 and 102 so that the flow direction of the fuel gas is opposite from the flow direction of the oxidizing gas.

As the fuel gas and the oxidizing gas are supplied to the unit cells 15 of the fuel cell stacks 10A and 10B, a reaction in which hydrogen is converted into hydrogen ions and electrons ($H_2 \rightarrow 2H^+ + 2e^-$) occurs on the fuel electrode side in each of the unit cells 15, and a reaction in which water is produced by oxygen, the hydrogen ions that pass through the electrolyte membrane, and electrons that are supplied via an external circuit ($2H^+ + 2e^- + (½)O_2 \rightarrow H_2O$) occurs on the fuel electrode side of each of the unit cells 15. The fuel cell 10 is formed by connecting in series a plurality (in this case, one pair) of such fuel cell stacks 10A and 10B, and each of the fuel cell stacks 10A and 10B includes the unit cells 15, in which such reactions occur, stacked together. Therefore, the fuel cell 10 can generate several hundred volts of electric power.

Next, referring back to FIGS. 1 and 2, the power system of the vehicle 1 using the fuel cell 10 as a power source will be described.

As shown in FIGS. 1 and 2, the power system of the vehicle 1 preferably includes a power plant (not indicated by any particular reference numeral) having the fuel cell 10 and auxiliary devices, a fuel gas storage tank 65, a power control device (not shown), the front wheel driving motor 40 and/or a rear wheel driving motor (not shown), a system controller (not shown), an electric power storage device (not shown) and a low-voltage and a high-voltage electrical cables. As mentioned above, the fuel cell 10 is configured and arranged to generate electric power by a reaction between the fuel gas and the oxidizing gas. The auxiliary devices of the power plant are actuated during the generation of power by the fuel cell 10. The fuel gas storage tank 65 stores the fuel gas. The power control device is configured to control the power generated by the fuel cell 10, and to adjust the supply of power to the respective parts of the vehicle 1. The driving motor 40 is coupled to the front wheels 5, and is configured and arranged to drive the front wheels 5 using the power generated by the fuel cell 10 and adjusted by the power control device. The system controller is configured to monitor the operating conditions of the vehicle 1 and the fuel cell 10, and to send control signals to the auxiliary devices and other devices. The electric power storage device is configured and arranged to accumulate or store the electric power if necessary. The low-voltage and high-voltage lines are used for the operation of the various types of auxiliary devices of the vehicle 1. Furthermore, a high-power system component 60 (power control device) is mounted under the floor of the passenger compartment 2 of the vehicle 1 as shown in FIG. 1.

In this embodiment of the present invention, the above-mentioned auxiliary devices of the power plant preferably include a fuel gas supply device 31 (hydrogen system part), an oxidizing gas supply device 32 (air system part), a temperature adjustment device (a radiator 50, etc.), and the like as shown in FIG. 1.

The fuel gas supply device 31 is configured and arranged to adjust the pressure, temperature, flow rate, and the like of the fuel gas (mainly hydrogen, but may also be a modified gas such as methanol or the like, or some other modified gas), and to supply the fuel gas to the fuel cell 10. For example, the fuel gas supply device 31 includes a mass flow meter configured and arranged to adjust the pressure, temperature, and flow rate of the fuel gas, and/or a fuel gas supply pump.

The oxidizing gas supply device 32 is configured and arranged to adjust the pressure, temperature, flow rate, and the like of the oxidizing gas (mainly air), and to supply the oxidizing gas to the fuel cell 10. For example, the oxidizing gas supply device 32 includes a mass flow meter which is configured and arranged to adjust the pressure and flow rate of the oxidizing gas, a dust collector which is configured and arranged to remove foreign matter from the oxidizing gas, an air compressor configured and arranged to pressurize the oxidizing gas, a humidifier configured and arranged to adjust the humidity of the oxidizing gas, and/or a diluter configured and arranged to dilute the oxidizing gas after the gas has passed through the fuel cell.

The temperature adjustment device (such as the radiator 50) is configured and arranged to adjust the temperature of the fuel cell 10 to an appropriate operating temperature. For example, the temperature adjustment device includes a coolant circulating pump configured and arranged to supply the coolant to the fuel cell 10, a heat exchange cycle device configured and arranged to dissipate the heat generated by the fuel cell 10 via a heat exchanger (e.g., the coolant), a heater configured and arranged to heat the fuel cell 10 by electrically generated heat or combustion heat when the temperature of the fuel cell 10 is low, and the like. In this illustrated embodiment, the radiator 50 is provided as the temperature adjustment device.

During the operation of the vehicle 1, the reaction gases (the fuel gas and the oxidizing gas) are supplied to the fuel cell 10 from the fuel gas supply device 31 and oxidizing gas supply device 32, respectively, based on an opening degree of an accelerator of the vehicle 1. The power (electricity) generated in the fuel cell 10 is transmitted through a power blocking device (not shown), and is adjusted to the power required for the respective parts of the vehicle 1 by the power control device. The power is then supplied to the front wheel driving motor 40. The torque of the driving motor 40 is transmitted to a drive shaft 41 to rotate the drive wheels 5 of the vehicle 1.

As mentioned above, the system controller (not shown) is configured to monitor the operating conditions of the vehicle 1 and the operating conditions of the fuel cell 10, and to send control signals to the auxiliary devices and other devices of the vehicle 1. Therefore, the system controller is configured to control the respective devices of the vehicle 1 to the appropriate operating conditions.

Figure 7:
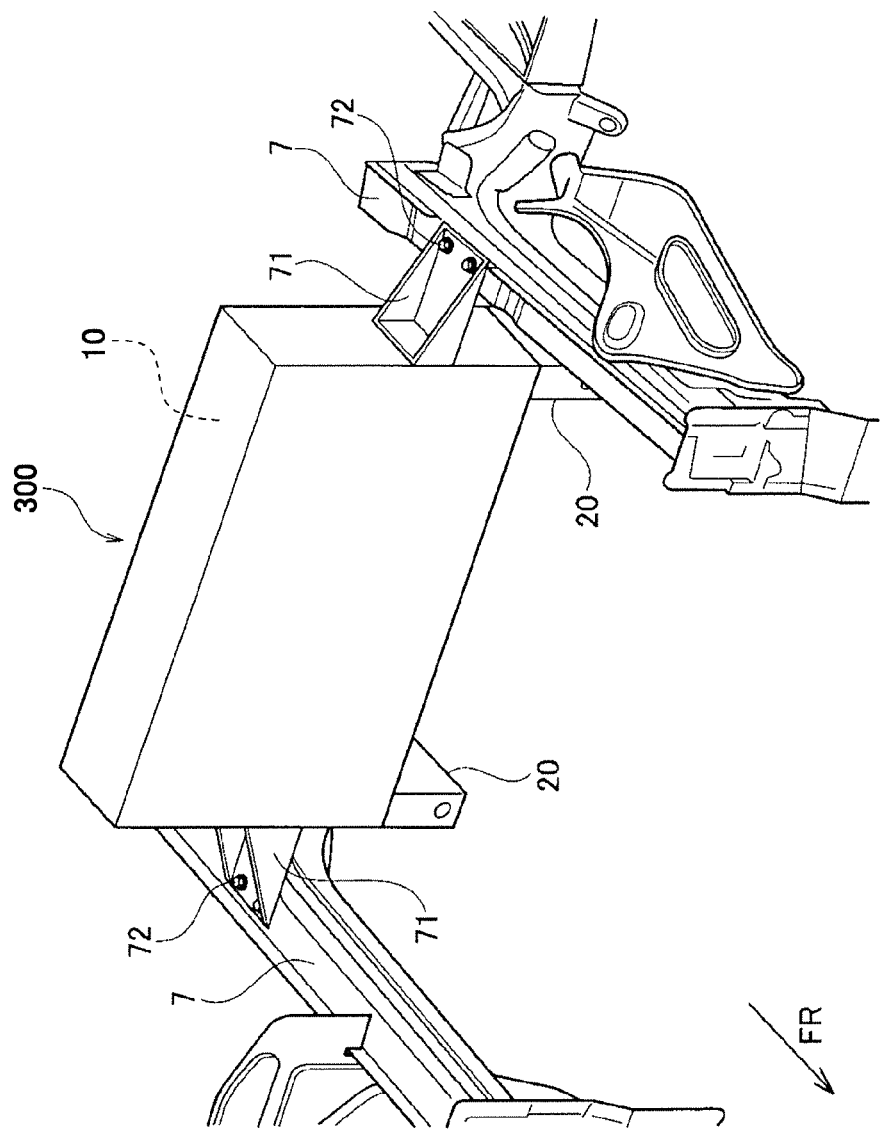
FIG. 7 is a rear side perspective view of the area of the fuel cell electric vehicle where the fuel cell is disposed illustrating a state in which the fuel cell is housed inside the fuel cell housing that is fixedly coupled to a vehicle frame in accordance with the first embodiment of the present invention.

In the first embodiment of the present invention, as shown in FIGS. 1 and 7, the two fuel cell stacks 10A and 10B in which a plurality of the unit cells 15 are stacked in the vertical direction of the vehicle 1 are accommodated in the housing 300. The supply/discharge manifolds 20 are disposed on the left and right ends of the lowermost surface in the stacking direction (vertical direction of the vehicle 1) of the fuel cell 10 housed inside the housing 300. As shown in FIG. 3, the supply/discharge manifolds 20 are respectively disposed on the left and right side of the upper portion of the driving motor 40. More specifically, the supply/discharge manifolds 20 are respectively installed in a pair of open spaces formed above the left and right end portions of the drive shaft 41 coupled to the driving motor 40.

Since the open spaces formed above the left and right end portions of the drive shaft 41 are extremely small, these open spaces are unsuitable for mounting the auxiliary devices of the fuel cell system that requires a large space. However, these open spaces are optimal for installing the supply/discharge manifolds 20, which are relatively small components. By installing the supply/discharge manifolds 20 in these open spaces, it is possible to set the vertical positions of lower ends of the supply/discharge manifolds 20 below the upper end of the driving motor 40 as shown in FIG. 3.

In cases where the fluid supply/discharge parts are disposed entirely on the undersurfaces of the fuel cell stacks as in the conventional fuel cell electric vehicle, the fluid supply/discharge parts must be installed in positions above the upper end of the driving motor. Therefore, the size of the fuel cell positioned above the fluid supply/discharge parts cannot be increased, which makes it impossible to increase the number of stacked unit cells in the fuel cell stacks in the conventional fuel cell electric vehicle. On the other hand, in the first embodiment of the present invention, the number of the unit cells 15 stacked together to form each of the fuel cell stacks 10A and 10B can be freely increased regardless of the height of the supply/discharge manifolds 20 by disposing the supply/discharge manifolds 20 in the open spaces formed above the left and right end portions of the drive shaft 41. Accordingly, the output of the fuel cell 10 can be increased by increasing the number of the unit cells 15 stacked together to form each of the fuel cell stacks 10A and 10B.

For example, when the thickness (height) of each of the fluid supply/discharge manifolds 20 is set at several tens of millimeters and when the fluid supply/discharge part of the conventional fuel cell electric vehicle 1 is, for example, 50 millimeters, the number of the unit cells 15 stacked together to form the fuel cell stacks 10A and 10B can be increased by the height of the fluid supply/discharge part of the conventional fuel cell electric vehicle 1. In other words, when the thickness of each of the unit cells 15 is 2 millimeters, the number of the unit cells 15 can be increased by a maximum of 25 unit cells. In such case, output of the fuel cell 10 can be increased by approximately 10%.

As shown in FIG. 3, since the supply/discharge manifolds 20 are disposed adjacent to both lateral end portions (left and right end portions) of the upper part of the driving motor 40, the length of the oblong shape (extending in the lateral direction of the vehicle 1) of the unit cells 15 in the fuel cell stacks 10A and 10B can be extended so that the unit cells 15 reach structural members of the vehicle 1 such as a pair of side frame members 7 of the vehicle frame. Accordingly, the area of each of the unit cells 15 in which the fuel gas and the oxidizing gas react can also be sufficiently increased, so that the current generated by each of the unit cells 15 can be increased as well.

Since the supply/discharge manifolds 20 are disposed on the lowermost portions of the fuel cell stacks 10A and 10B, the water produced by the chemical reaction of the fuel cell 10 can be quickly discharged to the supply/discharge manifolds 20 from the fuel cell stacks 10A and 10B by the force of gravity. Therefore, the fuel cell 10 is less likely to have inadequate power generating performance due to flooding (a phenomenon in which the gas diffusion layer is prevented from functioning by water, and thus, the chemical reaction tends not to proceed or is disrupted) and the like.

Since the supply/discharge manifolds 20 are disposed adjacent to both lateral end portions (left and right end portions) of the upper part of the driving motor 40, the height of the supply/discharge manifolds 20 can be increased without interfering with the large-diameter portion of the driving motor 40. Therefore, more water produced by the chemical reaction can be accumulated inside the supply/discharge manifolds 20, the water produced by the fuel cell stacks 10A and 10B can be discharged more easily, and the fuel cell 10 is less likely to have inadequate power generating performance due to flooding (a phenomenon in which the gas diffusion layer is prevented from functioning by water, and thus, the chemical reaction tends not to proceed or is disrupted) and the like.

Furthermore, in this embodiment of the present invention, the area in which the supply/discharge manifolds 20 and the fuel cell stacks 10A and 10B are sealed (i.e., the area in which the supply/discharge manifolds 20 and the fuel cell stacks 10A and 10B contact each other via gaskets) can also be made extremely small. Therefore, the sealing properties of the overall connection surfaces between the supply/discharge manifolds 20 and the fuel cell stacks 10A and 10B can be improved.

The supply/discharge manifolds 20 of the first embodiment are made compact because the supply/discharged manifolds 20 are spaced apart in the lateral direction of the vehicle 1. Therefore, the performance of the auxiliary devices of the fuel cell 10 can be improved by reducing the size and weight of the fuel cell system as a whole and by further expanding the spaces for other parts of the vehicle 1.

Next, the structure of the supply/discharge manifolds 20 and the fuel cell stacks 10A and 10B will be described in further detail with reference to FIGS. 5 and 6.

As mentioned above, the fuel cell 10 includes the two fuel cell stacks 10A and 10B formed by stacking the unit cells 15, a lower endplate 11 and an upper endplate 12 as shown in FIG. 5. The lower endplate 11 is installed in common on lower surfaces of the fuel cell stacks 10A and 10B, and the upper endplate 12 is installed in common on upper surfaces of the fuel cell stacks 10A and 10B. Although not shown in FIG. 5, the housing 300 (FIGS. 1 and 7) is provided to house the fuel cell 10, the lower endplate and the upper endplate 12 therein. The two fuel cell stacks 10A and 10B are aligned in the longitudinal direction of the vehicle 1 and mounted on the vehicle 1. As described above, the through-manifolds 101 for the fuel gas, the through-manifolds 102 for the oxidizing gas, and the through-manifolds 103 for the coolant are formed by holes or openings formed in each of the unit cells 15 that collectively form the fuel cell stacks 10A and 10B.

As shown in FIG. 5, the lower endplate 11 also includes a plurality of through-holes 111, 112 and 113 formed in positions that overlap with the through-manifolds 101, 102 and 103, respectively, of the fuel cell stacks 10A and 10B in a top plan view. Therefore, the through-holes 111, 112 and 113 of the lower endplate 11 fluidly communicate with the through-manifolds 101, 102 and 103, respectively, of the fuel cell stacks 10A and 10B.

As described above, the supply/discharge manifolds 20, each of which has a solid-rectangular block-shape, are disposed on the lower parts of the left and right end portions of the fuel cell 10 in the lateral direction of the vehicle 1. The supply/discharge manifolds 20 are coupled to the undersurface of the fuel cell 10 (undersurface of the lower endplate 11) via a pair of gaskets 13 as shown in FIG. 5.

Each of the supply/discharge manifolds 20 includes a fluid connection port 201, a pair of fluid connection ports 202 and a pair of fluid connection ports 203. The fluid connection port 201 is formed in a position that corresponds to the through-manifolds 101 so that the fluid connection port 201 of the supply/discharge manifold 20 and the through-manifolds 101 are fluidly communicated with each other when the supply/discharge manifold 20 is coupled to the fuel cell 10 (via the lower endplate 11 and the gasket 13). The fluid connection ports 202 are formed in positions that correspond to the through-manifolds 102 so that the fluid connection ports 202 of the supply/discharge manifold 20 and the through-manifolds 102 are fluidly communicated with each other when the supply/discharge manifold 20 is coupled to the fuel cell 10 (via the lower endplate 11 and the gasket 13). Likewise, the fluid connection ports 203 are formed in positions that correspond to the through-manifolds 103 so that the fluid connection ports 203 of the supply/discharge manifold 20 and the through-manifolds 103 are fluidly communicated with each other when the supply/discharge manifold 20 is coupled to the fuel cell 10 (via the lower endplate 11 and the gasket 13). Each of the gaskets 13 includes a through-hole 131, a pair of through-holes 132 and a pair of through-holes 133 in positions corresponding to the fluid connection ports 201, 202 and 203, respectively, formed on the upper end surface of the supply/discharge manifold 20.

The fluid connection port 201 of each of the supply/discharge manifolds 20 is disposed in an innermost (central) position among the fluid connection ports 201, 202 and 203.

The fluid connection port 201 of each of the supply/discharge manifolds 20 is a fluid port used for the fuel gas, and formed as an elongated slot so that the fluid connection port 201 is fluidly communicated with both of the through-manifolds 101 used for the fuel gas formed on one lateral side of the fuel cell stacks 10A and 10B. Furthermore, the two adjacent fluid connection ports 202 of each of the supply/discharge manifolds 20 are fluid ports used for the oxidizing gas, and are formed so as to communicate with the through-manifolds 102 used for the oxidizing gas formed on one lateral side of the fuel cell stacks 10A and 10B, respectively. Furthermore, the fluid connection ports 203 positioned adjacent to the fluid connection ports 202 (disposed on the outermost side, i.e., both longitudinal ends of the supply/discharge manifolds 20 with respect to the vehicle 1) are fluid ports used for the coolant water, and are formed so as to communicate with the through-manifolds 103 used for the coolant water formed on one lateral side of the fuel cell stacks 10A and 10B, respectively.

In the first embodiment of the present invention, the fluid connection ports 201, 202 and 203 of each of the supply/discharge manifolds 20 that cause the fuel cell fluids to flow through the fuel cell stacks 10A and 10B from the supply/discharge manifolds 20, and the through-manifolds 101, 102 and 103 formed through the fuel cell stacks 10A and 10B in order to supply and discharge the fuel cell fluids to and from each of the unit cells 15, are disposed in positions so that the fluid connection ports 201, 202 and 203 overlap with the through-manifolds 101, 102 and 103 in a top plan view. As a result, a region in which the supply/discharge manifolds 20 and the fuel cell stacks 10A and 10B are coupled together can be reduced to allow reliable sealing of the through-manifolds 101, 102 and 103. In other words, the sealing region between the supply/discharge manifolds 20 and the fuel cell 10 can be minimized. As a result, the probability of fuel gas leakage due to defective sealing or the like can be reduced compared to cases where the entire surfaces of the fuel cell stacks are sealed as in the conventional fuel cell electric vehicle.

Figure 6:
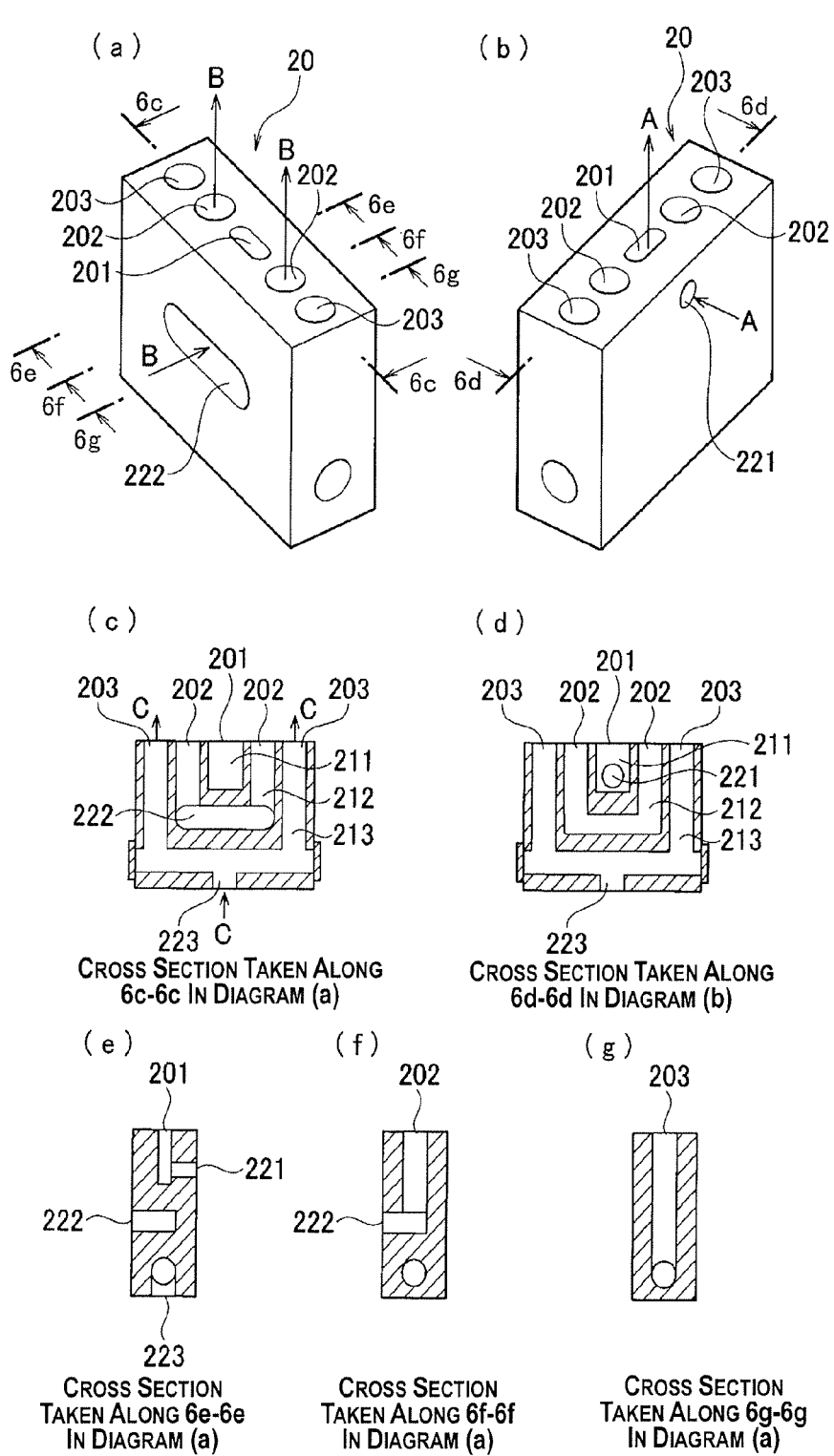
FIG. 6 is a series of diagrams (a) to (g) illustrating a structure of the supply/discharge manifold in accordance with the first embodiment of the present invention, wherein the diagram (a) is a perspective view of the supply/discharge manifold as viewed from a first side thereof, the diagram (b) is a perspective view of the supply/discharge manifold as viewed from a second side thereof, the diagram (c) is a cross sectional view of the supply/discharge manifold as taken along a section line 6c-6c in the diagram (a), the diagram (d) is a cross sectional view of the supply/discharge manifold as taken along a section line 6d-6d in the diagram (b), the diagram (e) is a cross sectional view of the supply/discharge manifold as taken along a section line 6e-6e in the diagram (a), the diagram (f) is a cross sectional view of the supply/discharge manifold as taken along a section line 6f-6f in the diagram (a), and the diagram (g) is a cross sectional view of the supply/discharge manifold as taken along a section line 6g-6g in the diagram (a)

As shown in FIG. 6, the fluid connection port 201 of each of the supply/discharge manifolds 20 used for the fuel gas fluidly communicates with a connection port 221 that is formed on a surface (e.g., a first side surface) of the supply/discharge manifold 20 other than the upper surface thereof via an internal channel 211 (fluid channel). The fluid connection ports 202 of each of the supply/discharge manifolds 20 used for the oxidizing gas fluidly communicate with a connection port 222 that is formed on a surface (e.g., a second side surface) of the supply/discharge manifold 20 other than the upper surface thereof via an internal channel 212 (fluid channel). The fluid connection ports 203 of each of the supply/discharge manifolds 20 used for the coolant fluidly communicate with a connection port 223 that is formed on a surface (e.g., a third bottom surface) of the supply/discharge manifold 20 other than the upper surface thereof via an internal channel 213 (fluid channel). The connection ports 221, 222 and 223 are preferably formed in outside surfaces (the first, second and third surfaces) of the supply/discharge manifold 20 other than the upper end surface thereof.

The fluid communication relationships are indicated by the arrows A, B and C in FIG. 6. On one lateral side of the fuel cell 10, the fuel gas A enters into the supply/discharge manifold 20 via the connection port 221, and leaves from the fluid connection port 201 via the internal channel 211 into the fuel cell stacks 10A and 10B. On the other lateral side of the fuel cell 10, the discharged fuel gas from the fuel cell stacks 10A and 10B enters into the supply/discharge manifold 20 via the fluid connection port 201, and leaves from the connection port 221 via the internal channel 211. On one lateral side of the fuel cell 10, the oxidizing gas B enters into the supply/discharge manifold 20 via the connection port 222, and leaves from the fluid connection ports 202 via the internal channel 212 into the fuel cell stacks 10A and 10B. On the other lateral side of the fuel cell 10, the discharged oxidizing gas from the fuel cell stacks 10A and 10B enters into the supply/discharge manifold 20 via the fluid connection ports 202, and leaves from the connection port 222 via the internal channel 212. On one lateral side of the fuel cell 10, the coolant C enters into the supply/discharge manifold 20 via the connection port 223, and leaves from the fluid connection ports 203 via the internal channel 213 into the fuel cell stacks 10A and 10B. On the other lateral side of the fuel cell 10, the discharged coolant from the fuel cell stacks 10A and 10B enters into the supply/discharge manifold 20 via the fluid connection ports 203, and leaves from the connection port 223 via the internal channel 213.

The connection port 221 of each of the supply/discharge manifolds 20 used for the fuel gas is formed in the inside surface of the supply/discharge manifolds 20 so that the connection ports 221 for the fuel gas are disposed inside surfaces of the supply/discharge manifolds 20 disposed on the left or right end portions of the fuel cell 10. As shown in FIG. 2, the fuel gas pipes 21 are connected, from the inside in the lateral direction of the vehicle 1, to the connection ports 221 (connected to the fuel gas channel 211), respectively, of the supply/discharge manifolds 20. One of the fuel gas pipes 21 is used for supplying the fuel gas to the fuel cell 10, and the other one of the fuel gas pipes 21 is used for discharging the fuel gas from the fuel cell 10. At least one of the fuel gas pipes 21 that is used for supplying the fuel gas to the fuel cell 10 is connected via the fuel gas supply device 31 to the fuel gas storage tank 65 mounted in the vehicle 1.

Each of the connection ports 222 used for the oxidizing gas is formed in the outside surface of the corresponding one of the respective supply/discharge manifolds 20 with respect to the lateral direction of the vehicle 1, and a pair of oxidizing gas pipes (not shown) is connected, from the outside in the lateral direction of the vehicle 1, to the oxidizing gas connection ports 222 (connected to the oxidizing gas channel 212) in the supply/discharge manifolds 20, respectively. In this case as well, one of the oxidizing gas pipes is used for supplying the oxidizing gas to the fuel cell 10, and the other one of the oxidizing gas pipes is used for discharging the oxidizing gas from the fuel cell 10. At least one of the oxidizing gas pipes that is used for supplying the oxidizing gas to the fuel cell 10 is connected to the oxidizing gas supply device 32.

Each of the connection ports 223 used for the coolant is formed in the undersurface (bottom surface) of the corresponding one of the supply/discharge manifolds 20 disposed on the left and right of the fuel cell 10. The connection ports 223 may be formed on the front surface (facing in the direction of travel of the vehicle 1) of the supply/discharge manifold 20 instead of the bottom surface thereof. A pair of coolant pipes 55 (one coolant pipe 55 shown in FIG. 2) is connected to the coolant water connection ports 223 of the supply/discharge manifolds 20, respectively. In this case as well, one of the coolant pipes 55 is used for supplying the coolant to the fuel cell 10 and the other one of the coolant pipes 55 is sued for discharging the coolant from the fuel cell 10. The coolant pipes 55 are preferably connected to the radiator 50 that serves as the heating control device.

As a result of these piping connections, the fuel gas, the oxidizing gas, and the coolant are distributed to the fuel cell stacks 10A and 10B from the supply/discharge manifold 20 disposed on one of the left and right ends of the lower parts of the fuel cell stacks 10A and 10B through the through-manifolds 101, 102 and 103 of the fuel cell stacks 10A and 10B. Then, the fuel gas, the oxidizing gas, and the coolant are distributed to the respective unit cells 15 of the fuel cell stacks 10A and 10B, so that electrical power is generated by a reaction at the surfaces of the unit cells 15. Then, after the generation of electrical power in the fuel cell stacks 10A and 10B, the fuel gas, the oxidizing gas, and the coolant are collected and flow into the supply/discharge manifold 20 on the opposite side, and the fuel cell fluids are collected by the corresponding one of the pipes coupled to the supply/discharge manifold 20.

The left and right supply/discharge manifolds 20 have an identical shape. Therefore, the number of parts required is reduced and the assembly characteristics of the fuel cell system can be improved (e.g., the assembly time can be shortened).

It is preferable to directly couple the housing 300 of the fuel cell 10 with the supply/discharge manifolds 20 by bolts or the like with the gaskets 13 sandwiched therebetween without any other elastic members being interposed. The direction of attachment (e.g., direction of the bolt insertion) in this case may be from the side of the supply/discharge manifolds 20 or from the side of the housing 300 of the fuel cell 10. By directly connecting the fuel cell 10 and the supply/discharge manifolds 20, the amount of piping, hosing, or the like used to connect the fuel cell 10 and the supply/discharge manifolds 20 can be reduced. Accordingly, the number of parts required can be reduced and weight of the fuel cell system may be reduced too. Furthermore, even in cases where a physical object enters into the motor compartment 3 from the outside due to a vehicle collision or the like, the possibility of damaging the piping, hoses, or the like can be reduced.

Since the housing 300 of the fuel cell 10 and the supply/discharge manifolds 20 effectively formed as an integral rigid body, possibility of shifting of the sealing parts between the supply/discharge manifolds 20 and the fuel cell 10 can be reduced in the case of a vehicle collision or the like.

FIG. 7 is a rear side perspective view of the area inside the motor compartment 3 where the fuel cell 10 is disposed illustrating a state in which the fuel cell housing 300 is coupled to the fuel cell 10 and illustrating an attachment structure between the housing 300 and the side frame members 7 of the vehicle 1 in accordance with the first embodiment. In the example shown in FIG. 7, a single rigid body in which the supply/discharge manifolds 20 are directly connected to the housing 300 of the fuel cell 10 is fastened to the side frame members 7 of the vehicle frame via a pair of mounting brackets 71. The mounting brackets 71 are preferably attached in advance to the housing 300 of the fuel cell 10, and each of the mounting brackets 71 is tightened on the corresponding one of the side frame members 7 by a pair of bolts 72. Therefore, the fuel cell 10 and the housing 300 are supported by the vehicle body frame. In this case, since the dimension of the fuel cell 10 in the longitudinal direction (dimension in the lateral direction of the vehicle 1) can be extended to the vicinity of the side frame members 7 because of the relationship in which the supply/discharge manifolds 20 are disposed on both lateral ends of the upper portion of the driving motor 40, there is no loss of space for installing peripheral parts by attaching the fuel cell 10 to the side frame members 7.

Since the housing 300 of the fuel cell 10 extends as a bridge between the left and right side frame members 7, the housing 300 of the fuel cell 10 plays a role equivalent to that of a cross member of the vehicle body frame. Accordingly, especially in the case of a vehicle side collision, it is possible to securely prevent damage to the fuel cell 10 or the supply/discharge manifolds 20 due to the entry of the side frame members 7 or external physical objects into the motor compartment 3.

In the present invention, the fuel gas supply components other than the fuel gas pipes 21 and the fuel gas storage tank 65 may be disposed in any position inside the motor compartment 3. However, considering the connection characteristics of the rear fuel gas storage tank 65 and the fuel gas pipes 21, it is desirable that the fuel gas supply components be disposed rearwardly of the fuel cell 10 or under the floor panel of the passenger compartment 2.

Accordingly, in the present invention, the fluid supply/discharge manifolds 20 are disposed on the left and right end portions of the lowermost part of the fuel cell 10 and the left and right end portions of the upper side of the driving motor 40. In other words, the supply/discharge manifolds 20 are spaced apart on the left and right side of the fuel cell 10 and disposed in the open spaces formed in the left and right end portions of the upper side of the driving motor 40. Since the driving motor 40 has a larger diameter portion in the center in the axial direction (the lateral direction of the vehicle 1), and a diameter of the driving motor 40 decreases toward the lateral end portions, the open spaces are formed on the upper side of the left and right end portions of the drive shaft 41. Accordingly, at least part of the undersurface of the fuel cell 10 can be utilized as a stacking space for the unit cells 15, thereby making it possible to increase the number of unit cells 15 that are stacked to form the fuel cell stacks 10A and 10B. Therefore, the output of the fuel cell 10 can be increased by increasing the number of stacked unit cells 15.

Second Embodiment

Figure 8:
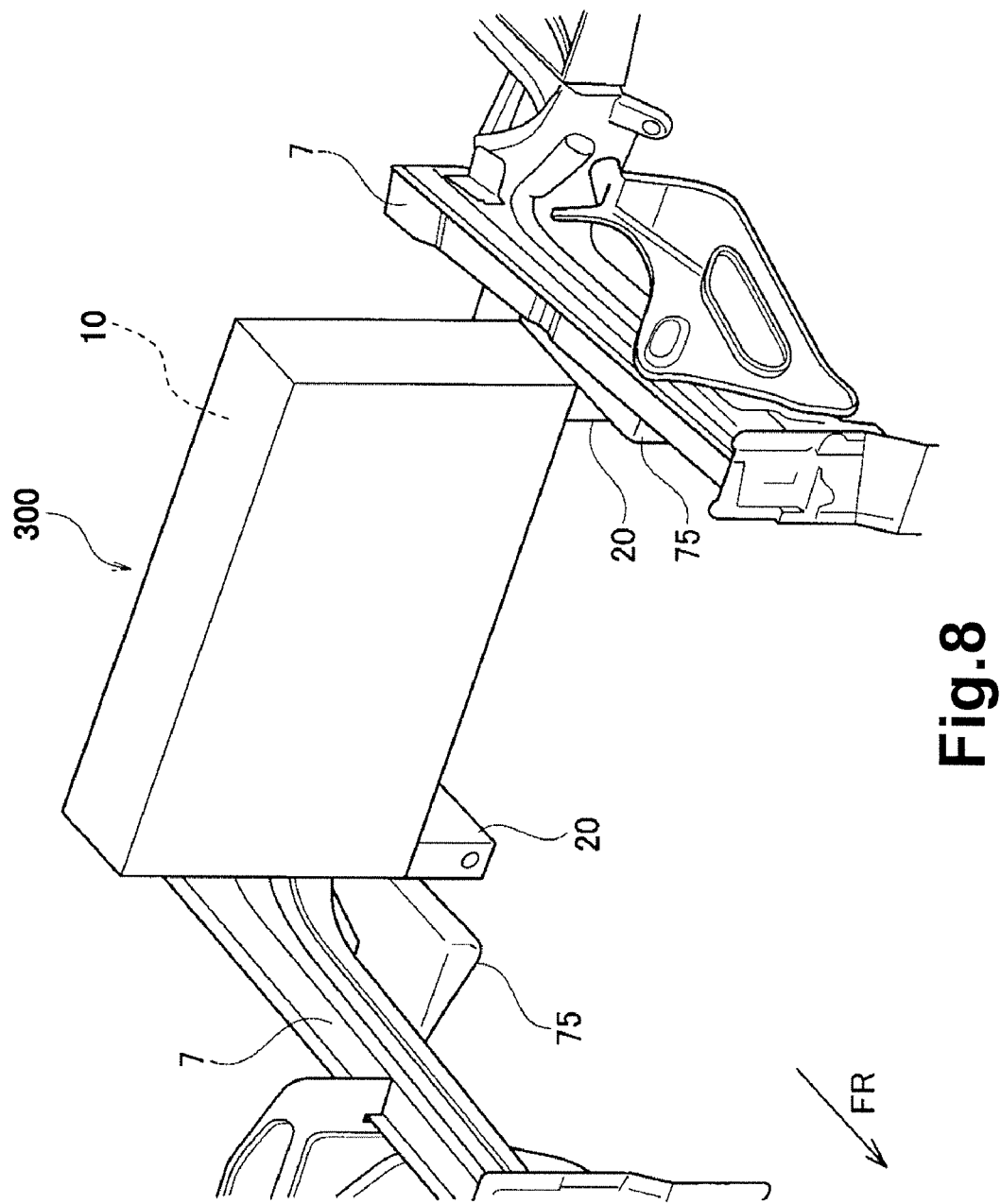
FIG. 8 is rear side perspective view showing an attachment structure of the fuel cell and the supply/discharge manifolds to a vehicle frame in accordance with a second embodiment of the present invention.

Referring now to FIG. 8, a fuel cell electric vehicle in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

FIG. 8 is rear side perspective view showing an attachment structure of the fuel cell 10 housed inside the housing 300 and the supply/discharge manifolds 20 to the side frame members 7 in accordance with a second embodiment of the present invention. In the second embodiment, the supply/discharge manifolds 20 that are directly connected to the housing 300 of the fuel cell 10 are fastened to the side frame members 7 of the vehicle frame via a pair of mounting brackets 75. In this respect, the second embodiment differs from the first embodiment, in which the housing 300 of the fuel cell 10 is directly fastened to the side frame members 7 as shown in FIG. 7. The fuel cell 10 can be supported by fastening the supply/discharge manifolds 20 to the side frame members 7. Although, in the illustrated embodiment, the supply/discharge manifolds 20 are fastened to the side frame members 7 via the mounting brackets 75, it would also be possible to fasten the supply/discharge manifolds 20 directly to the side frame members 7 without interposing such mounting brackets 75. Except for the attachment structure between the fuel cell 10 and the side frame members 7, the second embodiment has exactly the same construction as the first embodiment. Accordingly, the same effects as those of the first embodiment can be obtained in the second embodiment of the present invention.

Third Embodiment

Referring now to FIG. 9, a fuel cell electric vehicle in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity. The parts of the third embodiment that differ from the parts of the first embodiment will be indicated with a single prime (').

FIG. 9 is a series of diagrams (a) to (e) illustrating a structure of a supply/discharge manifold 20' in accordance with a third embodiment of the present invention, wherein the diagram (a) is a perspective view of the supply/discharge manifold 20' as viewed from a first side thereof, the diagram (b) is a perspective view of the supply/discharge manifold 20' as viewed from a second side thereof, the diagram (c) is a cross sectional view of the supply/discharge manifold 20' as taken along a section line 9c-9c in the diagram (a), the diagram (d) is a cross sectional view of the supply/discharge manifold 20' as taken along a section line 9d-9d in the diagram (b), and the diagram (e) is a cross sectional view of the supply/discharge manifold 20' as taken along a section line 9e-9e in the diagram (a).

The third embodiment of the present invention is identical to the first embodiment except that the supply/discharge manifolds 20' are used in the third embodiment instead of the supply/discharge manifolds 20. More specifically, each of the supply/discharge manifolds 20' of the third embodiment is constructed as a split structure formed by combining two members. In other words, two members are coupled together at a joint surface 250 as shown in the diagrams (a) and (b) of FIG. 9 to form the supply/discharge manifold 20'. When the supply/discharge manifolds 20' is constructed by coupling two members as in the third embodiment, right-angle bending of internal channels 212' and 213' can be abolished, unlike in the first embodiment shown in FIG. 6. Accordingly, in cases where the fuel cell fluids (the fuel gas, the oxidizing gas and the coolant) are supplied to the fuel cell stacks 10A and 10B, the pressure loss of the fuel cell fluids can be reduced. Therefore, the power generation performance of the fuel cell 10 may be improved.

Although in FIGS. 6 and 9, the supply/discharge manifolds 20 and 20' are illustrated as being made of metal material, it is preferable from the standpoint of securing strength of the supply/discharge manifolds 20 or 20' to use resins, especially reinforced plastics, as the material for the supply/discharge manifolds 20 or 20' than to use metals. On the other hand, in cases where a metal material is used for the supply/discharge manifolds 20 or 20', it is preferable to apply a non-conductive material coating on the coolant channel (the internal channels 213 and 213'), where it is desired to maintain the insulation resistance. In case where the supply/discharge manifolds 20 or 20' are made of metal material, it is easy to maintain the strength when the supply/discharge manifolds 20 or 20' are fastened to the vehicle body side frame members 7, as in the example shown in FIG. 8.

In the first through third embodiments described above, the fluid connection ports 201, 202 and 203 of the supply/discharge manifolds 20 are arranged in positions that overlap with the through-manifolds 101, 102 and 103, respectively, formed in the fuel cell stacks 10A and 10B in a top plan view. Therefore, the cross-sectional area of each of the fluid supply/discharge manifolds 20 can be reduced to a range that allows sealing of the through-manifolds 101, 102 and 103 of the unit cells 15. Accordingly, the sealing range of the supply/discharge manifolds 20 and the fuel cell 10 can be minimized, and thus, defective sealing can be reduced. Moreover, since the size of the supply/discharge manifolds 20 can be minimized, the size and weight of the fuel cell system as a whole can be further reduced. In addition, the fuel cell fluids discharged from the fuel cell stacks 10A and 10B can be conveyed to the supply/discharge manifolds 20 over a minimal distance. Therefore, the water produced inside the fuel cell stacks 10A and 10B can be quickly discharged into the supply/discharge manifolds 20 by the force of gravity, so that defective power generation caused by flooding can be prevented.

In the first through third embodiments described above, the coolant channel 213 (connected to the coolant connection ports 203) are disposed in the outer most positions than the fuel gas channel 211 (connected to the fuel gas connection ports 201), the oxidizing gas channel 212 (connected to the oxidizing gas connection ports 202). Therefore, insulation of the fuel cell 10 from the outside parts is possible by maintaining a sufficient insulation distance inside the supply/discharge manifolds 20 even in cases where the coolant circulates through the fuel cell stacks 10A and 10B that generate a high voltage of several hundred volts.

Specifically, since the fuel cell 10 generates a high voltage, it is necessary to prevent the transmission of a high voltage via the coolant in cases where the coolant passing through the internal parts deteriorates. Accordingly, in the first through third embodiments described above, the fluid channel 213 (connected to the fluid connection ports 203) through which the coolant from the outlet side of the fuel cell stacks 10A and 10B flows are disposed on the outermost sides in the supply/discharge manifolds 20. As a result, the insulation resistance can be maintained inside the supply/discharge manifolds 20.

Moreover, the distance between the radiator 50 disposed on the front end of the vehicle 1 and the coolant channel 213 (connected to the coolant connection ports 203) can also be shortened so that a reduction in weight can be achieved by shortening the coolant pipes 55 or hoses from the radiator 50 to the coolant ports 203 of the supply/discharge manifolds 20. In other words, as shown in FIG. 2, it is necessary to remove the heat absorbed inside the fuel cell 10 while the coolant, which has passed through the fuel cell 10, passes through the radiator 50 at the front of the vehicle 1. In this case, the piping and hoses disposed between the radiator 50 and the supply/discharge manifolds 20) can be improved by placing the coolant channel 213 (connected to the fluid connection ports 203) on the outermost side of the supply/discharge manifolds 20, and the distance of the coolant pipe 55 and hoses that connect the radiator 50 and the coolant channel 213 (connected to the fluid connection ports 203) of the supply/discharge manifolds 20 can be minimized. Accordingly, the weight of the vehicle 1 may be reduced and the productivity of the fuel cell system may be improved.

In the present invention, the temperature adjustment device other than the coolant pipe 55 can also be disposed inside the motor compartment 3. However, considering the connection characteristics of the radiator 50 and the coolant pipe 55, it is preferably to dispose the temperature adjustment device in front of the front-wheel driving motor 40.

In the first through third embodiments described above, the fluid connection port 201 (connected to the fuel gas channel 211) used for the fuel gas is disposed at the innermost position comparing to the fluid connection ports 202 used for the oxidizing gas and the fluid connection ports 203 used for the coolant. Therefore, the distance between the fuel gas channel 211 (connected to the fluid connection ports 201) and invading objects can be maximized even in cases where physical objects enter from the outside in a front end collision of the vehicle or the like. Accordingly, damage of the supply/discharge manifolds 20 can be securely prevented.

In other words, as a result of the fluid connection ports 201 being disposed in the innermost position of the supply/discharge manifold 20, the possibility of invading objects from the outside entering the fluid connection ports 201 can be greatly reduced even in cases where invading objects from the outside interfere with the supply/discharge manifolds 20.

In the first through third embodiments described above, the fuel gas pipe 21 that leads the fuel gas from the fuel gas storage tank 65 to the fuel gas channel 211 (connected to the fuel gas connection ports 221) is connected, from the inside in the lateral direction of the vehicle, to the connection ports 221 formed on the inside surfaces of the supply/discharge manifolds 20. Accordingly, even in cases where physical objects enter the vehicle 1 from the outside due to a vehicle side collision or the like, the distance between the invading objects and the fuel gas pipes 21 can be kept at a maximum distance. Therefore, damage of the fuel gas pipes 21 can be securely prevented.

In other words, since the fuel gas pipes 21 are generally thinner than other pipes used for the oxidizing gas and the coolant, connection between the fuel gas pipes 21 and the supply/discharge manifolds 20 can be accomplished in the narrow spaces between the supply/discharge manifolds 20 and the upper portion of the driving motor 40. Accordingly, even in cases where invading objects enter the vehicle 1 from the outside during a vehicle side collision or the like, the possibility of damage of the fuel gas pipes 21 can be greatly reduced.

In the first through third embodiments described above, the supply/discharge manifolds 20 are directly coupled to the housing 300 in which the fuel cell 10 is mounted via the gaskets 13. Accordingly, the housing 300 of the fuel cell 10 and the supply/discharge manifolds 20 can effectively form a single rigid body, so that the fuel leakage caused by shifting or the like of the sealing parts between the supply/discharge manifolds 20 and the housing 300 of the fuel cell 10 during a vehicle collision or the like can be prevented. Since the housing 300 is directly coupled to the supply/discharge manifolds 20 via the gaskets 13, the fuel cell fluids discharged from the fuel cell stacks 10A and 10B can flow to the supply/discharge manifolds 20 over the shortest distance. Therefore, water produced inside the fuel cell stacks 10A and 10B can be quickly discharged into the supply/discharge manifolds 20 by the force of gravity. Accordingly, defective power generation of the fuel cell 10 due to flooding can be prevented. Furthermore, since the size of the supply/discharge manifolds 20 can be minimized, the size and weight of the fuel cell system as a whole can be further reduced.

In the first through third embodiments described above, the supply/discharge manifolds 20 or the housing of the fuel cell 10 can be fastened to the side frame members 7 of the vehicle body frame, and the supply/discharge manifolds 20 and the housing 300 of the fuel cell 10 can be connected to the side frame members 7 of the vehicle body frame as a single rigid body. Therefore, damage of the fuel cell 10 or the supply/discharge manifolds 20 due to the entry of the side frame members 7 toward the motor compartment 3 can be securely prevented even during a vehicle side collision or the like.

In the first through third embodiments, the fuel cell 10 includes one pair of the fuel cell stacks 10A and 10B. However, the number of the fuel cell stacks 10A and 10B is not limited to two, and any number of the fuel cell stacks 10A and 10B can be used to form the fuel cell 10 to carry out the present invention.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:

1. A fuel cell electric vehicle comprising:
power outputting means for driving a pair of wheels;
electricity generating means for generating electricity used in the power outputting means with the electricity generating means being disposed above the power outputting means; and
fluid supplying/discharging means for transporting the fuel gas, the oxidizing gas and the coolant to or from the electricity generating means from lateral end portions of a lower part of the electricity generating means so that the fuel gas, the oxidizing gas and the coolant supplied from the fluid supplying/discharging means to the electricity generating means and discharged from the electricity generating means to the fluid supplying/discharging means flow in a substantially vertical direction with respect to a vehicle without the fuel gas, the oxidizing gas and the coolant passing through a center portion between the lower part of the electricity generating means and an upper part of the power outputting means with respect to a lateral direction of the vehicle.

2. The fuel cell electric vehicle according to claim 1, wherein
the fluid supplying/discharging means further has a function for transporting the coolant in an outermost position of the fluid supplying/discharging means with respect to the lateral direction of the vehicle.

3. The fuel cell electric vehicle according to claim 1, wherein
the fluid supplying/discharging means further has a function for transporting the fuel gas in an innermost position of the fluid supplying/discharging means with respect to the lateral direction of the vehicle.

4. The fuel cell electric vehicle according to claim 3, wherein
the fluid supplying/discharging means further has a function for transporting the fuel gas from a fuel gas storage device mounted on the vehicle via a fuel gas pipe at an inner surface of the fluid supplying/discharging means that faces the center portion between the lower part of the electricity generating means and an upper part of the power outputting means with respect to the lateral direction of the vehicle.

5. The fuel cell electric vehicle according to claim 1, wherein
the electricity generating means is housed inside a housing that is fixedly coupled to the fluid supplying/discharging means.

6. The fuel cell electric vehicle according to claim 1, wherein
the electricity generating means is housed inside a housing that is fixedly coupled to a pair of side frame members of a vehicle frame, respectively.

7. The fuel cell electric vehicle according to claim 1, wherein
the fluid supplying/discharging means are fixedly coupled to a pair of side frame members of a vehicle frame, respectively.

8. The fuel cell electric vehicle according to claim 1, wherein
the fluid supplying/discharging means includes a pair of first and second supply/discharge manifolds with each of the first and second supply/discharge manifolds being formed as a one-piece, unitary member.

9. The fuel cell electric vehicle according to claim 1, wherein
the fluid supplying/discharging means includes a pair of first and second supply/discharge manifolds with each of the first and second supply/discharge manifolds being formed of two separate members that are integrally coupled together.

10. The fuel cell electric vehicle according to claim 1, wherein
the fluid supplying/discharging means includes a pair of first and second supply/discharge manifolds with the first and second supply/discharge manifolds having an identical shape.

* * * * *